US012752377B2

(12) United States Patent
Gil et al.

(10) Patent No.: US 12,752,377 B2
(45) Date of Patent: Oct. 6, 2026

(54) METHOD FOR PRODUCING A METAL-CERAMIC SUBSTRATE, AND METAL-CERAMIC SUBSTRATE PRODUCED USING A METHOD OF THIS TYPE

(71) Applicant: Rogers Germany GmbH, Eschenbach (DE)

(72) Inventors: Vitalij Gil, Hersbruck (DE); Marco Englhard, Illschwang (DE); Markus Rüppel, Eschenbach (DE); Fabian Wagle, Bayreuth (DE)

(73) Assignee: ROGERS GERMANY GMBH, Eschenbach (DE)

( * ) Notice: Subject to any disclaimer, the term of this patent is extended or adjusted under 35 U.S.C. 154(b) by 793 days.

(21) Appl. No.: 18/017,334

(22) PCT Filed: Jul. 20, 2021

(86) PCT No.: PCT/EP2021/070217
§ 371 (c)(1),
(2) Date: Jan. 20, 2023

(87) PCT Pub. No.: WO2022/018061
PCT Pub. Date: Jan. 27, 2022

(65) Prior Publication Data

US 2023/0294213 A1 Sep. 21, 2023

(30) Foreign Application Priority Data

Jul. 21, 2020 (DE) ......................... 102020119208.8

(51) Int. Cl.
*C04B 37/02* (2006.01)
*B23K 26/38* (2014.01)
(Continued)

(52) U.S. Cl.
CPC ............ *B23K 26/402* (2013.01); *B23K 26/38* (2013.01); *C04B 37/021* (2013.01);
(Continued)

(58) Field of Classification Search
CPC ................ C04B 37/023; C04B 37/026; C04B 35/6455; C04B 37/021; C04B 2237/343;
(Continued)

(56) References Cited

U.S. PATENT DOCUMENTS

| | | | | |
|---|---|---|---|---|
| 11,330,707 B2 | 5/2022 | Britting et al. | | |
| 2005/0117302 A1* | 6/2005 | Emoto | ................ | H05K 3/0061 257/E23.102 |

(Continued)

FOREIGN PATENT DOCUMENTS

| | | | |
|---|---|---|---|
| DE | 19927046 A1 | 12/2000 | |
| DE | 102009033029 A1 | 1/2011 | |

(Continued)

OTHER PUBLICATIONS

International Search Report of the International Searching Authority (ISA/EP) mailed Oct. 25, 2021 in PCT Application No. PCT/EP2021/070217 filed Jul. 20, 2021, 6 pages.

*Primary Examiner* — Christina A Johnson
*Assistant Examiner* — Kelsey C Grace
(74) *Attorney, Agent, or Firm* — CANTOR COLBURN LLP

(57) ABSTRACT

A method for producing a metal-ceramic substrate (1) comprising:—providing a ceramic element (30) and at least one metal layer (10), wherein the ceramic element (30) and the at least one metal layer (10) extend along a main extension plane (HSE),—joining the ceramic element (30) to the at least one metal layer (10) to form a metal-ceramic substrate (1), in particular by means of a direct metal joining method, a hot isostatic pressing method and/or a soldering method,
(Continued)

and—machining the at least one metal layer (10) by means of a machine tool (40) and/or laser light in order to define a geometry, at least in some portions, of a side face (15) of the at least one metal layer (10) not running parallel to the main extension plane (HSE).

15 Claims, 11 Drawing Sheets

(51) Int. Cl.
*B23K 26/402* (2014.01)
*B23K 103/00* (2006.01)

(52) U.S. Cl.
CPC ........ *C04B 37/023* (2013.01); *B23K 2103/52* (2018.08); *C04B 2237/64* (2013.01)

(58) Field of Classification Search
CPC .......... C04B 2237/34; C04B 2237/368; C04B 2237/706; C04B 2237/348; C04B 2237/402; C04B 2237/401; C04B 2237/366; C04B 2237/403; C04B 2237/64; C04B 2237/407; C04B 2237/365; B23K 20/22; B23K 26/402; B23K 20/021; B23K 1/19; B23K 26/38; B23K 2103/172; B23K 2103/52; H01L 23/3735
See application file for complete search history.

(56) References Cited

U.S. PATENT DOCUMENTS

| | | | | |
|---|---|---|---|---|
| 2008/0045991 | A1* | 2/2008 | Mihalca | A61B 1/00096 228/122.1 |
| 2010/0157568 | A1* | 6/2010 | Ewe | H01L 24/24 438/114 |
| 2016/0187080 | A1 | 6/2016 | Remsburg | |
| 2019/0371690 | A1* | 12/2019 | Iwasaki | H01L 24/83 |
| 2020/0068696 | A1 | 2/2020 | Hsieh et al. | |

FOREIGN PATENT DOCUMENTS

| | | | |
|---|---|---|---|
| DE | 102012103786 | | 10/2013 |
| DE | 102013102540 | A1 | 8/2014 |
| DE | 102013104739 | A1 | 9/2014 |
| DE | 102018123681 | A1 | 3/2020 |
| EP | 2109138 | A1 | 10/2009 |
| JP | 2004342635 | A | 12/2004 |
| JP | 2005093782 | A | 4/2005 |
| JP | 2008186893 | A | 8/2008 |
| JP | 2010238753 | A | 10/2010 |
| JP | 6375086 | | 8/2018 |
| WO | 03046981 | A1 | 6/2003 |
| WO | 2008078788 | A1 | 7/2008 |
| WO | 2013163933 | A1 | 11/2013 |
| WO | 2014190968 | A1 | 12/2014 |
| WO | 2020064677 | A1 | 4/2020 |

* cited by examiner

METHOD FOR PRODUCING A METAL-CERAMIC SUBSTRATE, AND METAL-CERAMIC SUBSTRATE PRODUCED USING A METHOD OF THIS TYPE

CROSS-REFERENCE TO RELATED APPLICATIONS

This application is a National Stage filing of PCT/EP2021/070217, filed Jul. 20, 2021, which claims priority to DE 10 2020 119 208.8, filed Jul. 21, 2020, both of which are incorporated by reference in their entirety herein.

BACKGROUND

The present invention relates to a method for producing a metal-ceramic substrate and to a metal-ceramic substrate produced by such a method.

Carrier substrates for electrical components, for example in the form of metal-ceramic substrates, are sufficiently known from the prior art, for example as printed circuit boards or circuit boards, for example from DE 10 2013 104 739 A1, DE 19 927 046 B4 and DE 10 2009 033 029 A1. Typically, conductor junction areas for electrical components and conductor tracks are arranged on one component side of the metal-ceramic substrate, whereby the electrical components and conductor tracks can be interconnected to form electrical circuits. Essential components of the metal-ceramic substrates are an insulation layer, which is preferably made of a ceramic, and a metal layer or component metallization joined to the insulation layer. Due to their comparatively high insulation strengths, insulation layers made of ceramics have proven to be particularly advantageous in power electronics. By patterning the metal layer, conductor tracks and/or conductor junction areas for the electrical components may be realized.

For such carrier substrates, in particular for metal-ceramic substrates, there is a problem with the insulation layer on the one hand and the metallization on the other hand, in that because of different thermal coefficients of expansion, thermomechanical strains may be induced or caused in the event of heat generation, for example during operation or production of the carrier substrate, which may result in bending or even damage to the carrier substrate.

It has therefore become well-established in prior art to provide backside metallization on a side of the insulation layer opposite the component metallizations to counteract bending by use of the appropriate symmetry, with regard to the thermal expansion coefficients in the stacking direction. However, since component metallization generally has no more than 0.8 mm of a thickness, symmetrical design of the backside metallization would result in a backside metallization formed appropriately to be very thin, not providing the thermal capacity required, which thermal capacity is in particular desired to dissipate heat or to provide a thermal buffer during overload situations.

SUMMARY

Starting therefrom, it is the object of the present invention to provide a method for producing a metal-ceramic substrate and a metal-ceramic substrate the thermal shock resistance of which is improved compared to the methods and metal-ceramic substrates known from prior art.

This object will be achieved by providing a method for producing a metal-ceramic substrate as described herein and a metal-ceramic substrate as described herein. Further advantages and features will arise from the subclaims as well as the description and the accompanying figures.

According to a first aspect of the present invention, a method for producing a metal-ceramic substrate will be provided, comprising:

- providing a ceramic element and at least one metal layer, wherein the ceramic element and the at least one metal layer extend along a main extension plane,
- joining the ceramic element to the at least one metal layer to form a metal-ceramic substrate, in particular by means of a direct metal joining method, a hot isostatic pressing method and/or a soldering method, and
- machining the at least one metal layer by means of a mechanical tool and/or laser light to define a geometry, at least in some portions, of a side face of the at least one metal layer not running parallel to the main extension plane, in particular on the fabricated metal-ceramic substrate.

BRIEF DESCRIPTION OF THE DRAWINGS

Further advantages and features will arise from the following description of preferred embodiments of the subject matter of the invention, while reference will be made to the accompanying figures. It is within the scope of the invention, to combine individual features of the individual embodiment, wherein in the figures.

DETAILED DESCRIPTION

Figure 1:
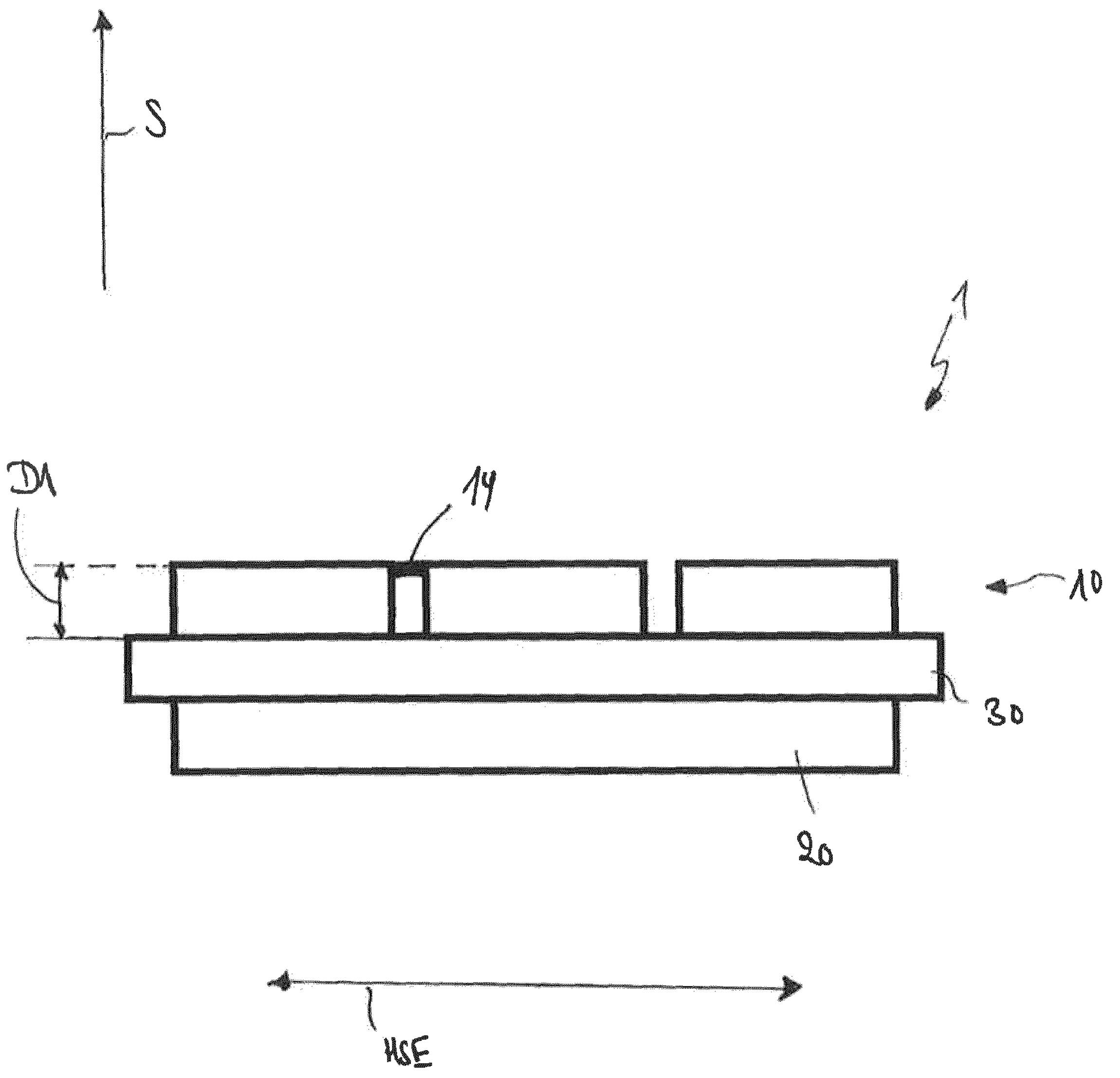
FIG. 1 is a metal-ceramic substrate according to a first preferred embodiment of the present invention.

Contrary to the methods known from prior art, a mechanical tool and/or a laser is to be used to define the geometry of the side faces, at least in some portions. In other words, the method according to the invention is used to implement a corresponding course of the side faces, for example to improve the thermal shock resistance of the bond between the at least one metal layer and the ceramic element. This has proven to be particularly advantageous when patterning or when forming the side faces is not done within a conventional etching process, in which a curved or oblique etching edge course is produced at the boundary region between the at least one metal layer and the ceramic element, which has an advantageous effect on the thermal shock resistance of the bond between the at least one metal layer and the ceramic layer.

Furthermore, it has proven to be advantageous to use a mechanical tool and/or laser light to define the geometry of the side faces, since this is a more precise and, in particular, more reproducible way of defining the side faces in terms of geometry thereof, in particular compared with etching to produce the side faces. By defining the geometry, in particular, it is to be understood that the action of the mechanical tool and the laser light creates a course of the side face which, in the fabricated metal-ceramic substrate, deviates from a course which is essentially straight and perpendicularly extends to the main extension plane or to the upper surface of the ceramic element. In particular, it is even possible to use a mechanical tool and/or a laser to set up side face courses specifically modulated in which, for example, a radius of curvature of the side face is modulated along a direction running parallel to the main extension plane and/or maxima and minima are locally formed in the course of the side face.

In particular, the fabricated metal-ceramic substrates are printed circuit boards in which the ceramic element serves as an insulation between two metal sections of the at least one metal layer. The individual sections of the at least one metal layer form conductor tracks and/or junctions where electrical or electronic components are attachable, which are carried by the ceramic elements or by the printed circuit board. By forming the side faces, in particular in the context of patterning, the individual metal sections of the at least one metal layer are separated from each another so that so-called insulation trenches will be realized between the individual metal sections, thus electrically insulating the individual metal sections from each other.

Furthermore, it is preferably conceivable that the course of the side face is defined or determined by a combination of an etching procedure and machining with a mechanical tool and/or laser.

Furthermore, it is particularly preferred that, in addition to the at least one metal layer, a backside metallization is provided on the side of the ceramic element opposite the at least one metal layer. Preferably, the backside metallization is provided to counteract deflection of the metal-ceramic substrate, which would otherwise be expected due to the different thermal expansion coefficients. In addition, in order to be able to provide a buffer during an overload situation, it is preferred that the backside metallization has a thickness appropriately large to provide sufficient heat capacity. In order to counteract bending caused by the comparatively large thickness of the backside metallization, it has proven to be advantageous to design the thickness of the at least one metal layer to be comparably large to the thickness of the backside metallization. Herein, too, the increased thickness of the at least one metal layer has proven to be particularly advantageous for increasing the heat capacity, since this may already cause effective heat dissipation on the component side. Basically, a thicker at least one metal layer and/or backside metallization also has proven to be advantageous as it increases the heat capacity, allowing better cooling and simultaneously increasing mechanical stability. This allows omitting a bottom plate, for example.

Preferably, the at least one metal layer is machined by means of a mechanical tool prior to and/or following joining to the ceramic element, preferably by means of different tools, whereby a plurality of different geometric shapes may be realized. Preferably, machining is performed by means of the mechanical tool and/or by means of the laser light prior to joining the at least one metal layer with the ceramic element and, following joining, the metal layer on the opposite side is machined by means of the same or a different mechanical tool, by means of laser light and/or by means of an etching agent for local removal of metal. Preferably, this is how patterning is performed. Machining of the metal layer is done on the opposite sides, preferably congruently along the stacking direction running perpendicular to the main extension plane.

Materials that are conceivable for use with the at least one metal layer or the backside metallization in the metal-ceramic substrate are copper, aluminum, molybdenum and/or the alloys thereof, as well as laminates such as CuW, CuMo, CuAl, AlCu and/or CuCu, in particular a copper sandwich structure having a first copper layer and a second copper layer, wherein a grain size in the first copper layer is different from the grain size in a second copper layer. Furthermore, it is preferred that the primary metal ply is to be surface-modified, in particular as a component metallization. Among the surface modification procedures that are conceivable are, for example, sealing with a noble metal, in particular silver and/or gold, or ENIG ("electroless nickel immersion gold"), nickel or edge grouting on the at least one metal layer to suppress crack formation or expansion.

Preferably, the ceramic element comprises $Al_2O_3$, $Si_3N_4$, AlN, an HPSX ceramic (i.e., a ceramic having $Al_2O_3$ matrix comprising an x percentage of $ZrO_2$, for example $Al_2O_3$ including 9% $ZrO_2$=HPS9 or $Al_2O_3$ including 25% $ZrO_2$=HPS25), SiC, BeO, MgO, high-density MgO (>90% of the theoretical density), TSZ (tetragonally stabilized zirconium oxide) or ZTA as a material for the ceramic. It is also conceivable for the ceramic element to be designed as a composite or hybrid ceramic, in which a plurality of ceramic layers, which are different in terms of their material composition, are arranged on top of each other and are joined together to form an insulating layer in order to combine various desirable properties. It is also conceivable for a metallic intermediate layer to be arranged between two ceramic layers, which is preferably thicker than 1.5 mm and/or thicker than the two ceramic layers in total. Preferably, a ceramic that is as thermally conductive as possible is used for the lowest possible thermal resistance.

By "DCB process" (direct copper bond technology) or "DAB process" (direct aluminum bond technology) the person skilled in the art understands such a process which for example is used to join metal layers or sheets (e.g., copper sheets or foils or aluminum sheets or foils) to each other and/or to ceramics or ceramic layers, using metal or copper sheets or metal or copper foils having a layer or a coating (surface-melt layer) on the their surface sides. In this process, described for example in U.S. Pat. No. 3,744,120 A or in DE23 19 854 C2, this layer or coating (surface-melt layer) forms a eutecticum having a melting temperature below the melting temperature of the metal (e.g., copper), so that by placing the foil on the ceramic and by heating all the layers, they can be joined together, and can be joined together by surface-melting the metal or copper essentially in the region of the surface-melting layer or oxide layer, respectively, only.

In particular, for example, the DCB process then comprises the following process steps:

Oxidizing a copper foil such that a uniform copper oxide layer is formed;

Placing the copper foil on the ceramic layer;

Heating said composite to a process temperature between about 1025 to 1083° C., e.g., to about 1071° C.;

Cooling to room temperature.

By an active soldering method, e.g., for joining metal layers or metal foils, in particular also copper layers or copper foils, to ceramic material, a process is meant which is specifically also used for the production of metal-ceramic substrates, a bond between a metal foil, for example copper foil, and a ceramic substrate, for example aluminum nitride ceramic, is produced at a temperature between about 600-1000° C. using a hard solder which, in addition to a main component such as copper, silver and/or gold, also contains an active metal. This active metal, which is for example at least one element selected from the group consisting of Hf, Ti, Zr, Nb, Ce, creates a bond by chemical reaction between the solder and the ceramic, while the bond between the solder and the metal is a hard soldering joint. Alternatively, a thick film process is conceivable to be used for joining.

Hot isostatic pressing is known, for example, from EP 3 080 055 B1, the contents of which are herein explicitly included by reference regarding hot isostatic pressing.

Preferably, in the fabricated state the at least one metal layer is intended to taper at least in some portions when increasing the distance from the ceramic element. This has proven to be advantageous in particular for heat dissipation and allows the electrical components to be arranged as close as possible to the edge of the respective metal section of the at least one metal layer.

Furthermore, it is preferred for the at least one metal layer to have a thickness perpendicular to the main extension plane greater than 1 mm, preferably greater than 1.3 mm and particularly preferably between 1.5 and 3 mm. In particular, for metal-ceramic substrates having thicknesses such large, the use of a mechanical tool or laser light for separating individual sections in the at least one metal layer has proven to be advantageous, since this will create comparatively narrow isolation trenches, whereby the maximally dense pattern of conductive tracks and junctions may be realized. Otherwise, an aspect ratio of less than 1 would be realized by an etching process correspondingly, wherein aspect ratio defines a ratio of depth to width. Accordingly, the thickness of the at least one metal layer above 1 mm would cause a comparatively large distance between the two metal sections which are electrically insulated from each other in the at least one metal layer. In particular, it is advantageous if the recess between two sections of the at least one metal layer has an aspect ratio greater than 1, preferably greater than 1.5 and particularly preferred greater than 2.

Furthermore, it is preferred that machining using the mechanical tool and/or the laser light is carried out prior to joining the ceramic element to the at least one metal layer. In this way, it is advantageously possible to pattern and/or machine that side of the at least one metal layer facing the ceramic element in the joined state. Subsequently, the remaining metallization (preferably in the form of a rib) joining the individual metal sections (in particular on the side or surface side of the at least one metal layer facing away from the ceramic element) may be removed to ensure complete insulation between two adjacent sections of the at least one metal layer.

Furthermore, it is conceivable for the mechanical tool to be an embossing and/or punching device and/or to comprise a milling or sawing blade. The light used may be, for example, continuously emitted or pulsed light. What is preferred is an ultra-short pulse laser light, with light pulses the pulse length or pulse durations of which are shorter than one nanosecond.

Preferably, the geometry of the side face will be determined by tool guiding. For example, a specific lifting movement together with a lateral movement of the mechanical tool will result in a specific course to be printed or inserted into in the side face. Herein, for example, the movement of a tip of the milling tool can determine the curved course.

It is also conceivable for the geometry of the side face to vary along the circumference of the metal layer. In other words, by making use of a mechanical tool and/or a laser beam device to machine the side faces, it is possible to set a geometry that varies in some portions, and a geometry that varies along the direction of circulation around the outermost edge of the at least one metal layer. For example, the geometry can change with respect to a curvature of a curved course or, for example, the type of geometry changes, for example from curved side faces to oblique or stepped side faces.

Furthermore, machining is preferably carried out such that a rib connecting at least two portions of the at least one metal layer is realized. In particular, the rib is dimensioned such that it permits, for example, simple and dimensionally stable handling or transport of the at least one metal layer and thus permits simple arrangement from the ceramic element. It is also conceivable that the rib is not completely removed following joining the at least one metal layer to the ceramic element, but that portions of the rib are provided as a conductor junction area. In other words, the rib is only partially removed, i.e., an overhanging portion of the rib is remains in place, and is intended to create a bond to another metal portion and/or to an electrical component and/or an external control source.

Preferably, the rib is removed following joining, at least in some portions, for example by laser and/or etching and/or milling and/or spark erosion and/or an electrochemical process. In this way, the final separation of the sections in the at least one metal layer may be realized.

Furthermore, it is conceivable for the mechanical tool to comprise a milling tool, for example a milling head, and a saw blade and/or a punching or embossing member, the shape of which determines the geometry of the side face. This makes it possible to determine the geometry of the side face with the shape of the tool in a simple and easy manner and to define it in a reproducible and precise manner.

Furthermore, it is preferred for the fabricated side face, at least in some portions, to be oblique and/or bent and/or curved and/or stepped. Accordingly, the optimized geometry for the side face can be adjusted to suit the respective application, so that the fabricated metal-ceramic substrate has sufficient thermal shock resistance for a desired comparatively high service life of the metal-ceramic substrate to be guaranteed.

Preferably, the machining is to be performed by means of a plurality different mechanical tools. This allows further refinements in the geometry to be realized, in particular in a versatile manner. For example, different milling or embossing tools having different outer contours are used to realize different geometries or a specific course on the side face.

In particular, the at least one metal layer and/or the at least one additional metal layer are to be patterned prior to joining them to become the pre-composite.

Preferably, the at least one metal layer is divided into a plurality of insulated metal sections and subsequently the geometry of the side face of the insulated metal sections is determined. In other words: Following attaching the at least one metal layer to the ceramic element, the at least one metal layer is first electrically insulated from each other by inserting insulation trenches. The side faces, which extend, for example, essentially perpendicular to the main extension plane, are then brought into the desired geometric shape by the use of mechanical machining and/or laser light.

Alternatively, it is conceivable for the side face and geometry thereof to be determined simultaneously with the creation of the metal sections insulated from each other. This will promote the process, since no additional steps are required.

In particular, machining of the at least one metal layer to define a geometry, at least in some portions, of a side face not running parallel to the main extension plane is largely carried out using laser light. By "largely" it is meant that more than 50%, preferably more than 75% and particularly preferably more than 85% of the expenditure of time required for creating the side face is attributable to laser light machining.

Another object of the present invention is a method for producing a metal-ceramic substrate comprising the steps of:

- providing a ceramic element, at least one metal layer, and at least one further metal layer, wherein the ceramic element, the at least one metal layer, and the at least one further metal layer extend along a main extension plane,
- joining the at least one metal layer and the at least one further metal layer to form a pre-composite,
- joining the ceramic element to the pre-composite, in particular by means of a direct metal joining method, a hot isostatic pressing method and/or a soldering method, and
- machining the at least one metal layer by means of a mechanical tool and/or laser light and machining the at least one further metal layer by means of etching, preferably prior to joining, in order to define a geometry, at least in some portions, of a side face of the pre-composite not running parallel to the main extension plane, of the at least one metal layer and the at least one further metal layer. All properties and advantages described for the above method may analogously be applied to this method and vice versa.

Another object of the present invention is a metal-ceramic substrate produced by the method according to the invention. All properties and advantages described for the method may analogously apply to the metal-ceramic substrate and vice versa. In particular, the metal-ceramic substrate is a component of a power module and serves as a carrier for electrical or electronic components.

FIG. 1 schematically shows a metal-ceramic substrate 1 according to a first preferred embodiment of the present invention. Preferably, such metal-ceramic substrate 1 is a carrier for electrical components. In particular, the metal-ceramic substrate 1 is to comprise a ceramic element 30 and at least one metal layer 10, wherein the ceramic element 30 and the at least one metal layer 10 run along a main extension plane HSE. The at least one metal layer 10 is attached to the ceramic element 30, the at least one metal layer 10 and the ceramic element 30 being arranged on top of each other in a stacking direction S running perpendicular to the main extension plane HSE. In particular, the at least one metal layer 10 is to comprise a plurality of metal sections which are arranged, for example, in a manner of being electrically insulated from each other, adjacent to each other along a direction extending parallel to the main extension plane HSE.

Furthermore, it is particularly preferred that a backside metallization 20 is provided on the ceramic element 30 on the side opposite the at least one metal layer 10, as viewed in the stacking direction S. The backside metallization 20 is provided in particular to counteract bending that would otherwise occur in operation, which is caused by thermo-mechanical strains that, in turn, result from different expansion coefficients in the at least one metal layer 10 and the ceramic element 30. At the same time, the backside metallization 20 is to provide sufficient heat capacity, which is desired in particular to provide an appropriate buffer in overload situations. In this context, the increased thickness of the at least one metal layer 10 also has proven to be particularly advantageous herein for increasing the heat capacity, since this may already cause effective heat dissipation on the component side. Basically, a thicker at least one metal layer 10 and/or backside metallization 20 also has proven to be advantageous because it increases the heat capacity, allowing better cooling, and at the same time increases the mechanical stability. This allows eliminating the need for a bottom plate, for example.

This requires a certain thickness of the backside metallization 20 to provide the desired heat capacity. In order to simultaneously ensure in turn a symmetrical design of the at least one metal layer 10 and the backside metallization 20, it is preferred for the at least one metal layer 10 to have a thickness D1 extending perpendicularly to the main extension plane HSE, which is greater than 1 mm, preferably greater than 1.3 mm or particularly preferably between 1.5 mm and 3 mm. Using such comparatively large thicknesses of the at least one metal layer 10, it is possible to realize a comparatively high symmetry between the at least one metal layer 10 and the backside metallization 20 and, at the same time, to ensure sufficient heat capacity by virtue of the backside metallization 20. In order to provide the surface of the ceramic element 30 with metal sections as densely as possible for such large thicknesses D1 of the at least one metal layer 10, it is desirable to realize comparatively narrow trenches, i.e., so-called isolation trenches, between the individual metal sections of the at least one metal layer 10.

It is preferred for a region between two metal sections of the at least one metal layer 10 to have an aspect ratio greater than 1, preferably greater than 1.5 and particularly preferably greater than 2. Since such aspect ratios cannot be realized by etching, or can only be realized at great expense, it is advantageous for such patterning of the at least one metal layer 10 to be realized by means of a mechanical tool 40 or by means of laser light. In this context, it is particularly preferred that the at least one metal layer 10 is patterned prior to joining, in particular prior to joining using a DCB, DAB-o-or active soldering method or using hot isostatic pressing, or is machined by means of a mechanical tool 40 and/or by means of laser light. For example, the mechanical tool 40 may be a milling tool and/or a stamping or embossing tool used to pattern the at least one metal layer 10. It is preferred for machining by means of the mechanical tool 40 or the laser light to be carried out such that the at least one metal layer 10 still remains transportable as a component. For this purpose, for example, separating individual metal sections from each other by means of the mechanical tool 40 or the laser light will be omitted, i.e., ribs 14 are realized between the metal sections in the at least one metal layer 10 which are sufficiently thick so that they do not bend during transport or handling by means of a robot, for example.

After the at least one metal layer 10 is arranged on the ceramic element 30, in particular such that the patterned side of the at least one metal layer 10 faces the ceramic element 30, a joining process, such as a direct joining process, a hot isostatic pressing method or an active soldering method, is preferably used to join the at least one metal layer 10 to the ceramic element 30.

In a subsequent process step, it is conceivable for the rib 14 connecting two adjacent metal portions of the at least one metal layer 10 to be partially or completely removed, for example by means of mechanical machining, by means of laser light or a chemical process or etching process. As a result, following joining, metal portions are provided on the ceramic element 10 which are arranged comparatively close to each other, thus providing comparatively narrow isolation trenches. It is also conceivable, for example, to use laser light or a mechanical tool 40 for removing the rib 14 only partially or in some portions, and, for example, to use rib portions laterally projecting from the upper side of the at least one metal layer 10 in the direction of the main extension plane HSE as junction lugs or junction regions, for example, to join different metal portions of the at least one metal layer 10 to each other and/or to realize a bond between components and/or to establish a junction to a an external controller.

Figure 2:
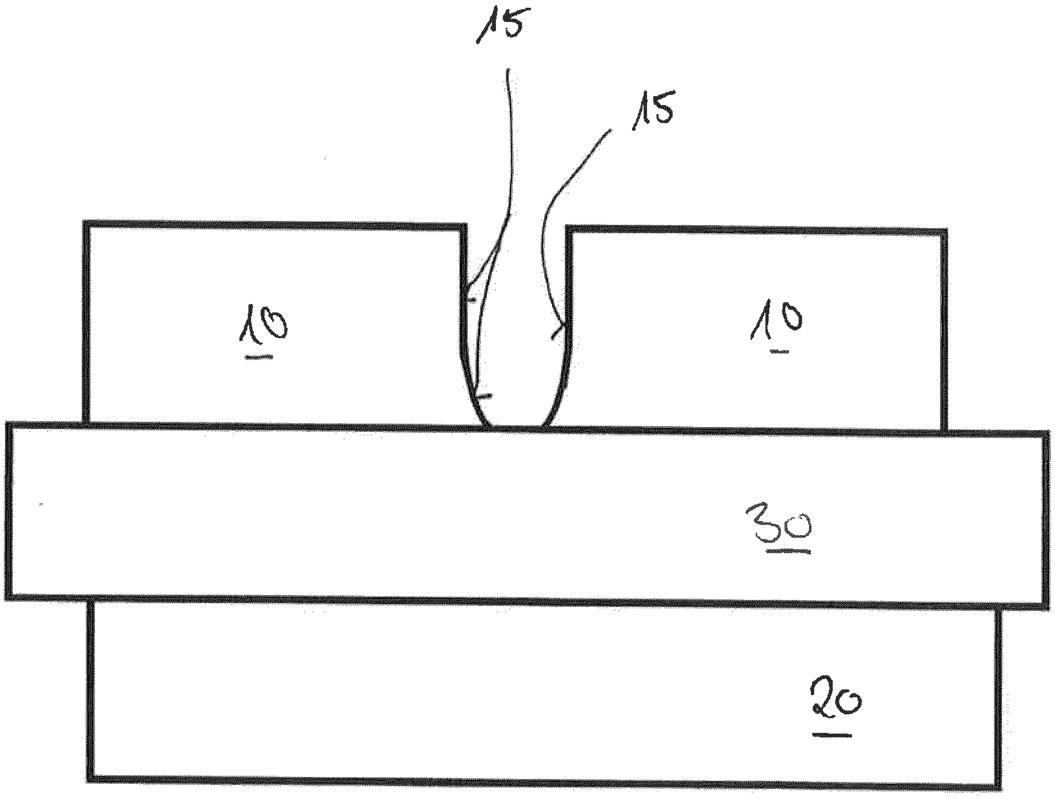
FIG. 2 is a metal-ceramic substrate according to a second preferred embodiment of the present invention.

FIG. 2 shows a metal-ceramic substrate 1 according to a second example embodiment of the present invention. In particular, herein a geometry of a side face 15 which is not parallel to the main extension plane HSE is to be defined by machining by means of the mechanical tool 40 and/or the laser light. While, in prior art, a course is created in the side face 15 which is in particular curved or oblique to the main extension plane HSE, in particular by etching, this is not necessarily true when using a mechanical tool 40 or laser light. However, since the oblique or curved side face 15, in particular at the boundary region between the at least one metal layer 10 and the ceramic element 30, has proven to be advantageous for thermal shock resistance, it is advantageous for comparatively narrow isolation trenches, which cannot be realized by etching alone, to use the mechanical tool 40 or laser light to define the geometry of the side face 15. In the embodiment shown in FIG. 2, sections of the side face 15 in the at least one metal layer 10 in the lower third, i.e., in the third facing the ceramic element 30, assume a bent or curved course. As a result, it is also possible to advantageously realize the course of the side face 15, which course is advantageous for thermal shock resistance, also for such metal-ceramic substrates 1 in which the at least one metal layer 10 is comparatively thick and in which aspect ratios are provided which are greater than 1, and thus etching alone of the isolation trenches is not readily obvious.

Furthermore, it has proven to be advantageous that by using a mechanic tool 40 and/or laser light to form the geometry of the side face 15, this geometry can be created more reproducibly compared to creation thereof by an etching process, and it may also be modified more precisely. In particular, it is even conceivable that by means of the mechanical tool 40 and/or the laser light a radius of curvature along the side face 15 or 20 can be modified or is modified in a direction running parallel to the main extension plane HSE. This is generally not true in the case of isotope-mediated etching, wherein independent matching of the various portions of the side face 15 to each other is not possible or is possible to a limited extent only.

Figure 3:
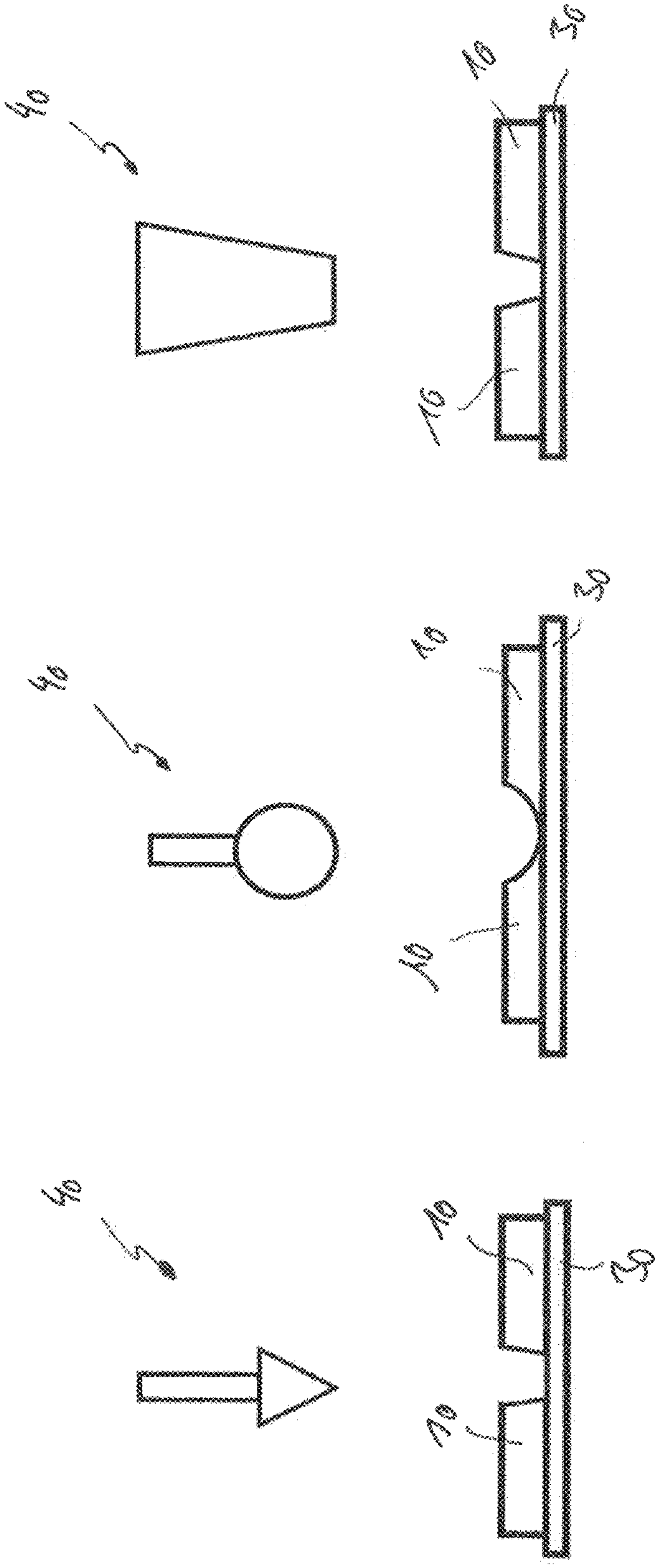
FIG. 3 is a method for producing a metal-ceramic substrate according to a first, a second and a third embodiment of the present invention.

FIG. 3 shows metal-ceramic substrates 1 according to a third (left), fourth (middle) and fifth (right) embodiment of the present invention. In particular, FIG. 3 schematically shows the respective metal-ceramic substrates 1 with mechanical tools 40 used to pattern the at least one metal layer 10 to realize appropriate recesses or isolation regions between portions of the at least one metal layer 10. For example, the example embodiment on the left side shows a milling head that is substantially tapered, whereby a substantially sloping geometry of the side faces 15 may be realized. In particular, the milling head is to be narrower than the recess between the adjacent metal sections of the at least one metal layer 10. In the center of FIG. 3, a milling head having a rounded profile or a rounded outer side is shown, which in particular allows a curved course of the side faces 15 in the at least one metal layer 10 to be realized. In the embodiment shown on the right, a saw blade is provided for producing or patterning between two metal sections of the at least one metal layer 10, i.e., for determining the geometry of the side faces 15, the outer contours of the saw blade being essentially wedge-shaped or trapezoidal in order to pattern corresponding side faces 15 on the at least one metal layer 10 such that they run obliquely to the main extension plane HSE, in particular not forming an angle of 90°.

Figure 4:
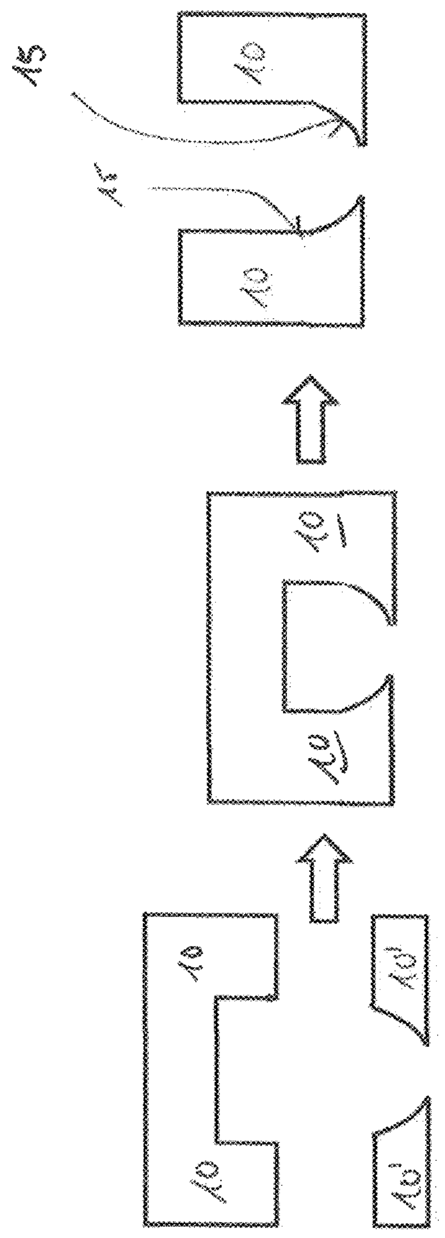
FIG. 4 is a method for producing a metal-ceramic substrate according to a fourth embodiment of the present invention.

FIG. 4 illustrates a method for producing a metal-ceramic substrate 1 according to a fourth preferred embodiment of the present invention. In particular, the at least one metal layer 10 is to be patterned, for example by means of an embossing tool, and is combined with a further metal layer 10' into which a patterning has been embedded using an etching process. In particular, the at least one patterned metal layer 10 is patterned such that the pattern thereof is designed to be congruent with the pattern in the at least one further metal layer 10', so that joining the at least one metal layer 10 and the at least one further metal layer 10' results in a pre-composite in which the geometries produced during the individual patterning operations are combined with each other in the pre-composite. In particular, the thickness of the at least one metal layer 10 is to be more than 0.5 times, preferably more than 1.0 times and particularly preferably more than 2.0 times of the thickness of the at least one further metal layer 10'. As a result, side faces 15 may be realized that are comparatively large and deep, preferably, straight and/or perpendicular to the main extension plane (partial), in particular in the at least one metal layer 10, while a bent or curved course of the (partial) side face 15 is created by means of the at least one further metal layer 10', in particular at a section facing the ceramic element 30 in the fabricated state. In this context, it is particularly preferred that the at least one metal layer 10 and/or the at least one further metal layer 10' is heated in the pre-composite so as to be joined, such that a bond is formed between therebetween, as a result of which the at least one metal layer 10 and the at least one further metal layer 10' are joined to form a one-piece, in particular monolithic body which may comparatively easily be applied to a ceramic element 30. In this context, after joining the at least one metal layer 10 or the pre-composite to the ceramic element 30, the at least one metal layer 10 or the pre-composite is machined such that a rib 14 connecting the two adjacent metal portions will be removed and/or will be patterned such that two adjacent metal portions are produced, having a comparatively narrow insulation trench arranged between them. In this context, it is conceivable, for example, that the etching process in the at least one further metal layer 10' creates the desired curved or bent side face on the fabricated at least one metal layer 10 or on the pre-composite.

Figure 5:
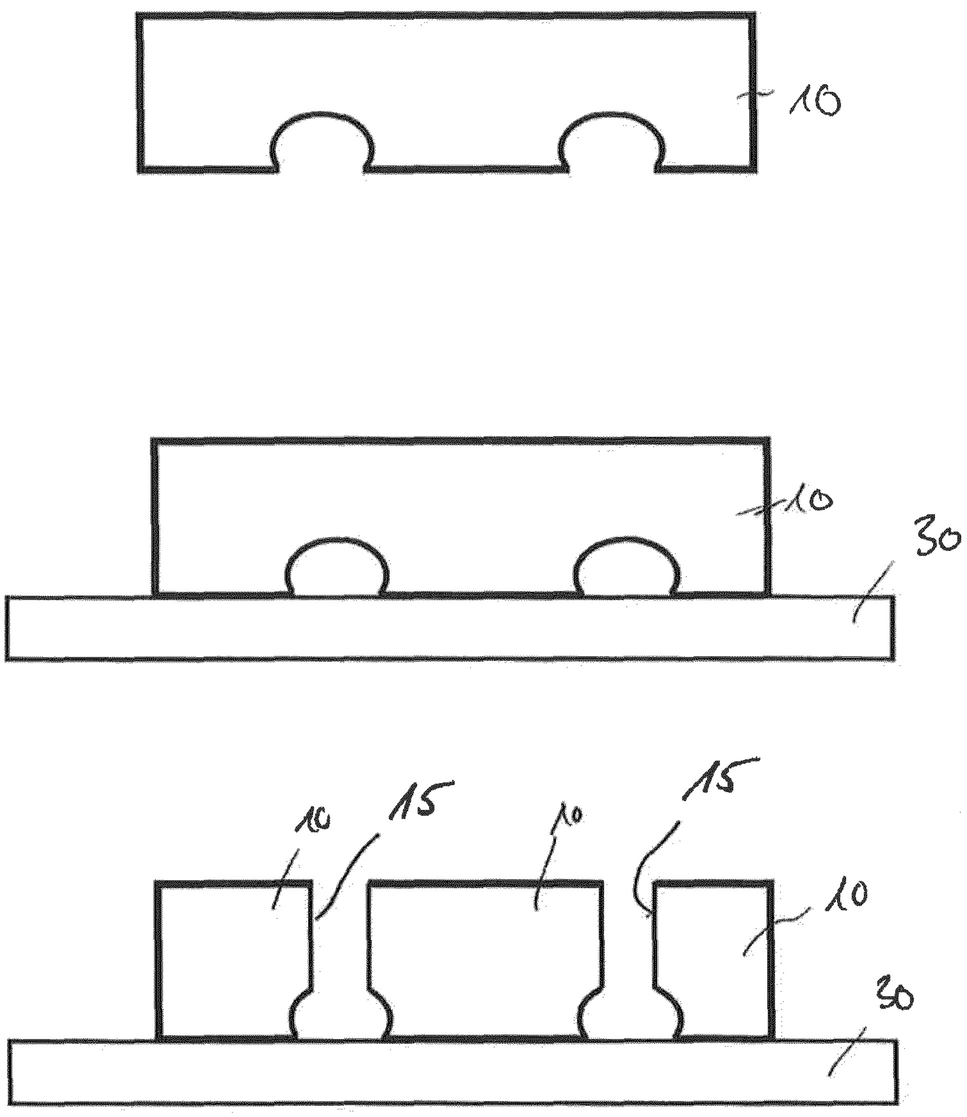
FIG. 5 is a method for producing a metal-ceramic substrate according to a fifth embodiment of the present invention.

FIG. 5 schematically illustrates a method for producing a metal-ceramic substrate 1 according to a fifth embodiment of the present invention. In this example embodiment, patterning is to be performed in the at least one metal layer 10 on a side facing the ceramic element 30 in the fabricated state, for example by means of etching, and subsequently joining the at least one metal layer 10 to the ceramic element 30 is to be realized. In this context, it is in particular preferred for the etched patterns in the at least one metal layer 10 to be placed such that they define the areas of the planned isolation trenches. The isolation trenches will subsequently be exposed by mechanical machining in the regions above these etched patterns. The course or geometry of the side face 15 is defined by a combination of etching and mechanical machining or by means of laser light. This, for example, allows appropriate isolation trenches having an overlap in the area of the ceramic element 30 to be realized. In particular, there is no risk of damage to the ceramic element 30 when using the mechanical tool 40.

Figure 6:
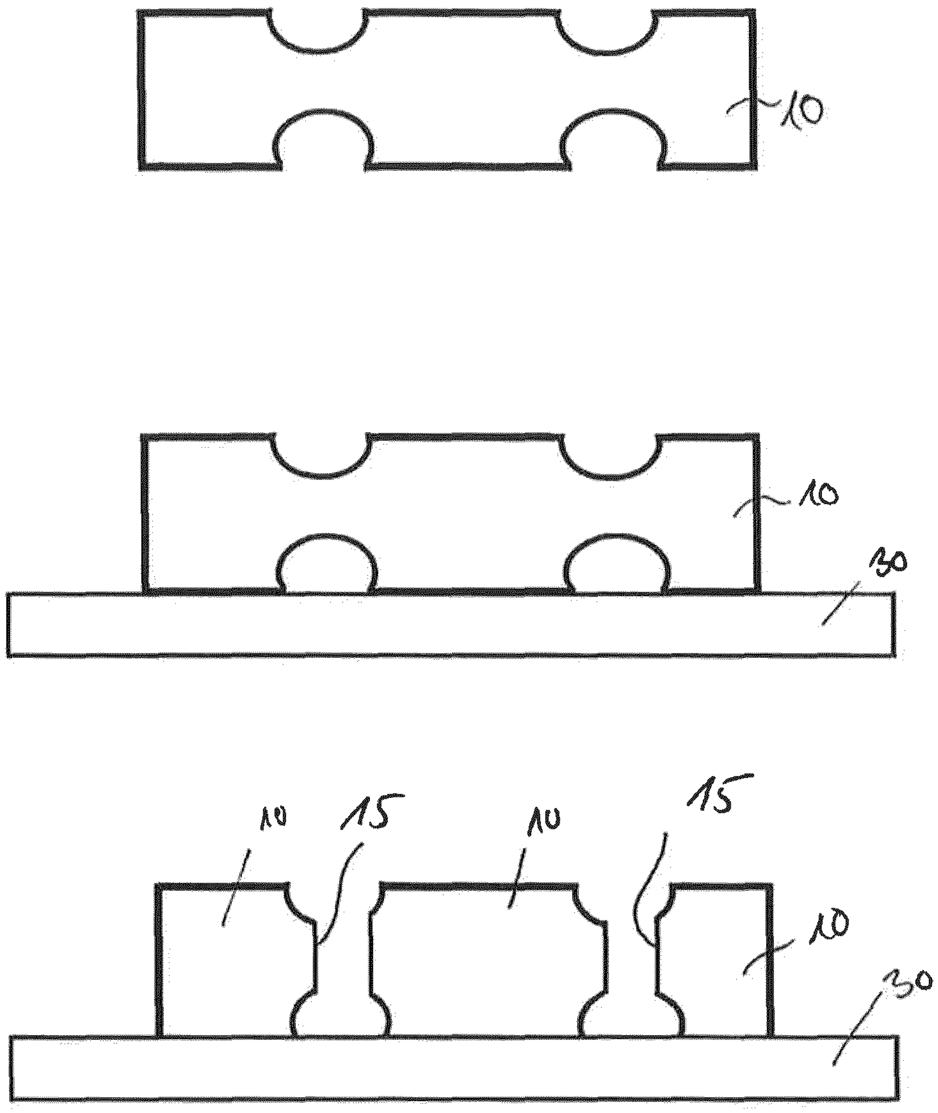
FIG. 6 is a method for producing a metal-ceramic substrate according to a sixth embodiment of the present invention.

FIG. 6 illustrates a method for producing a metal-ceramic substrate 1 according to a sixth exemplary embodiment of the present invention. Herein, the embodiment of FIG. 6 essentially differs from that of FIG. 5 only in that, in addition to patterning the side facing the ceramic element 30 in the fabricated state, patterning is additionally performed on the opposite side, in particular congruently with the patterning on the side facing the ceramic element 30. As a result, i.e., due to the patterning on both sides of the at least one metal layer 10, it also may be seen from the outside, even after joining to the ceramic element 30, at which points the pattern has been applied to the at least one metal layer 10, so that in subsequent mechanical machining, for example by means of a milling or a sawing tool, and/or by means of laser light, the metal areas which are located between the patterned upper sides or patterned recesses on the opposite side of the at least one metal layer 10 may still be removed, thus finally exposing the insulation trenches.

Figure 7:
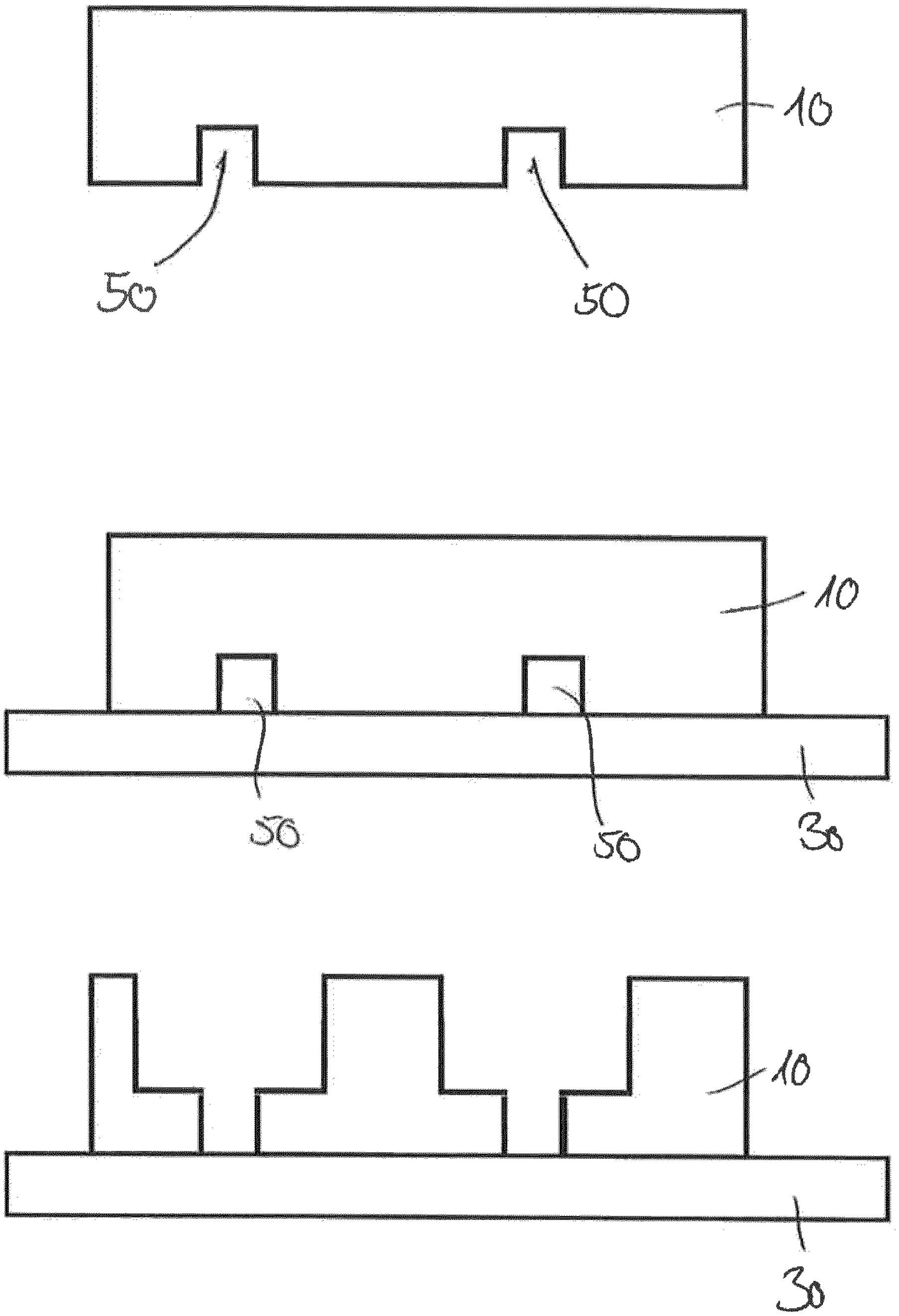
FIG. 7 illustrates a method for producing a metal-ceramic substrate according to a seventh embodiment of the present invention.

FIG. 7 illustrates a method for producing a metal-ceramic substrate 1 according to a seventh exemplary embodiment of the present invention. In particular, herein the cavities or recesses 50 are to be inserted into the at least one metal layer 10 in a preparation step, in particular using a mechanical tool or laser light, to subsequently join the at least one metal layer 10 to the ceramic element 30 at the side comprising the recess 50 and/or cavities. Subsequently, by further removing metal from the at least one metal layer 10, for example by an etching process, the cavity or recess 50 facing the ceramic element 30 during the joining process, will be exposed from the opposite side. A stepped course of the side face 15 will thus preferably be realized by realizing recesses of different widths on the opposite sides of the at least one metal layer 10. In this context, it is particularly preferred to provide for a step height of the side face 15 of the individual steps to be approximately equal in size to provide the most efficient heat dissipation for the components arranged in the edge region of the at least one metal layer 10 or the corresponding metallization. Alternatively, it is also conceivable that, for example, the step depth created after joining is greater than that caused in the preparation step when forming the recess 50.

In particular, it has proven to be advantageous that comparatively thin isolation trenches may be realized by this combination of realizing the recess 50 or cavity in the preparation step and subsequently exposing it.

FIGS. 8*a* to 8*h* show various embodiments of metal-ceramic substrates 1, in particular of various isolation trenches. The isolation trenches are, in particular, the regions of a metal-ceramic substrate 1 where two adjacent metal layer sections are separated from each other and will mechanically be joined to each other via the ceramic element 30 having an isolating effect.

Figure 8A:
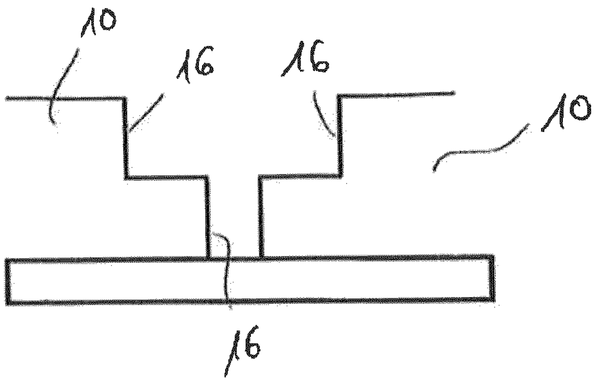
FIGS. 8*a* to 8*h* depict various side faces for a metal-ceramic substrate produced by a method according to an example embodiment of the present invention.

FIG. 8*a* shows a stepwise course of the side face 15, which can be produced, for example, by the method shown in FIG. 7. Moreover, any further embodiments of the side face 15 shown in FIGS. 8*a* to 8*h* may preferably be realized by combining formation of a recess 50 and/or cavity by means of a mechanical tool or laser light on the side of the at least one metal layer 10 facing the ceramic element 30 after joining, while the recess 50 and/or cavity will be realized on the side of the at least one metal layer 10 facing away from the ceramic element 30, for example by means of an etching process, laser light and/or a mechanical tool, preferably after joining.

Figure 8B:
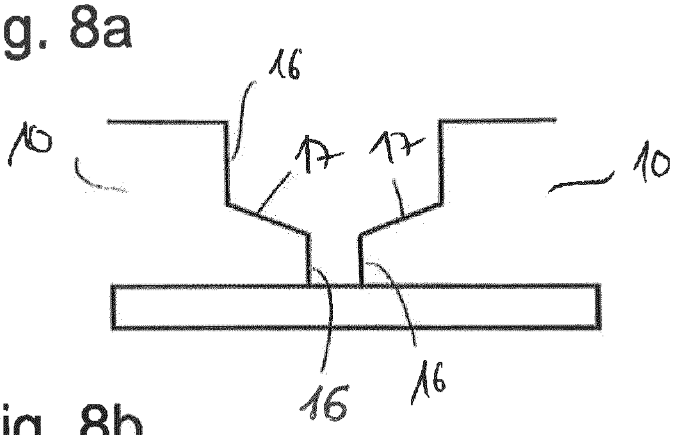

FIG. 8*b* shows a side face 15, in which an intermediate section 17 obliquely extending with respect to the main extension plane HSE is provided between two substantially vertically extending side face sections 16.

Figure 8C:
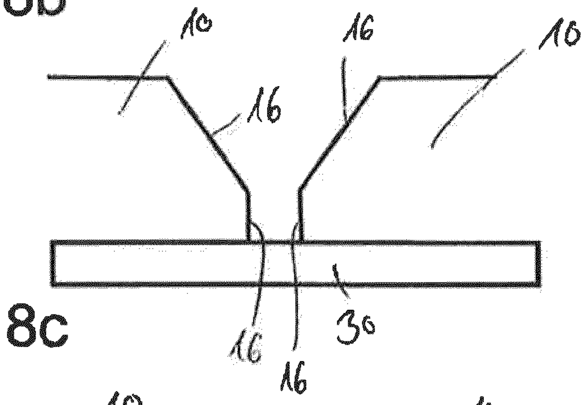

FIG. 8*c* shows a side surface section 16 obliquely extending with respect to the main extension plane HSE from the upper surface of the at least one metal layer 10 to a substantially vertically extending side surface section 16 adjoining the ceramic element 30.

It is preferred for the at least one metal layer 10 to have a plurality of side surface sections 16 that are differently inclined with respect to the main extension plane HSE. In this regard, one of the side surface sections 16 may substantially be vertical or perpendicular to the main extension plane HSE. By setting different inclination angles of the side surface sections 16, it may advantageously be possible to stronger affect the electrical behavior of the adjoining metal sections of the at least one metal layer 10.

Figure 8D:
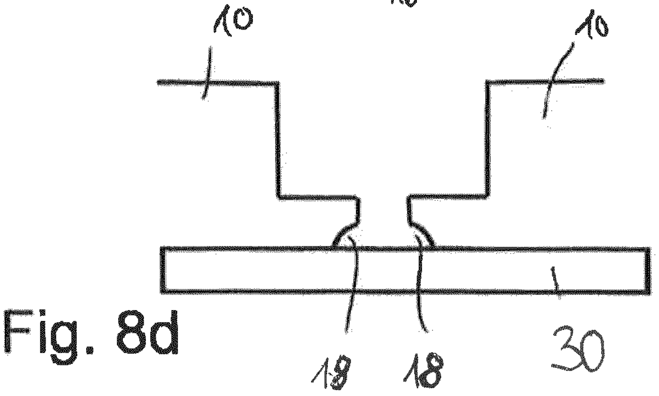

FIG. 8*d* shows an embodiment which substantially differs from the purely stepwise course, for example as shown in FIG. 8*a*, in that the at least one metal layer 10 has a curved course, in particular in the form of an undercut 18, on the side facing the ceramic element 30. In other words, FIG. 8*d* combines a curved course of the at least one metal layer 10 in the region adjacent to the ceramic element 30 with a stepwise course of the at least one metal layer 10. Thereby, the curved course is curved or oriented such that a lateral extension of the recess 50 (as measured parallel to the main extension plane HSE) of the at least one metal layer 10 decreases with increasing distance from the ceramic element 30.

Figure 8E:
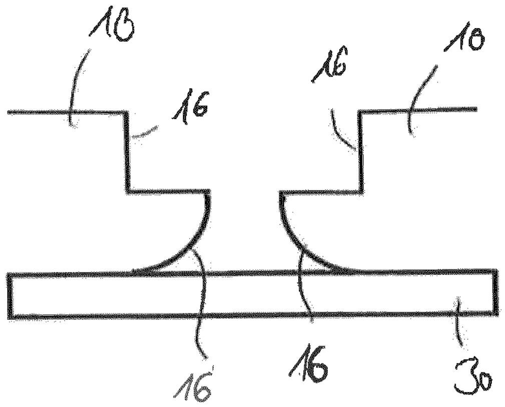

FIG. 8*e* shows the bent or curved course of the at least one metal layer 10—contrary to the embodiment of FIG. 8*d*—to extend from the ceramic element 30 to a substantially horizontally extending side surface section 16. Thus, the substantially vertically extending side surface section 16 of FIG. 8*d* will be omitted herein.

Figure 8F:
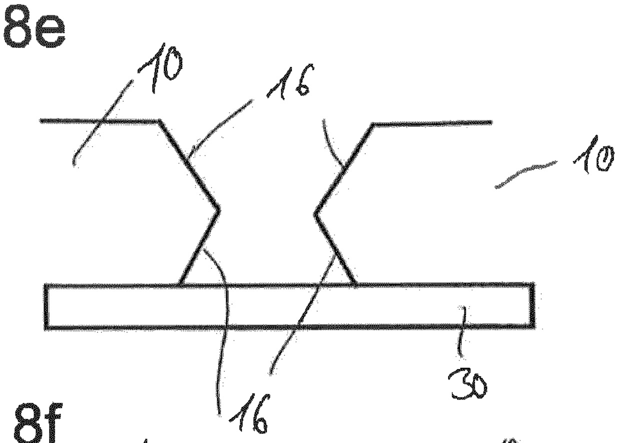

In the embodiment of the example of FIG. 8*f*, it may particularly be seen that by successively forming the recesses 50 during formation of the insulation trench, the at least one metal layer 10 first tapers in its lateral extent with increasing distance from the ceramic element 30, and then increases again until the side face 15 merges into the upper side of the at least one metal layer 10. Preferably, the side face 15 is to be formed of at least two, preferably of exactly two, three or four, side surface sections 16, the individual side surface sections 16 differing from each other in respect of their geometric shape or their general course.

Figure 8G:
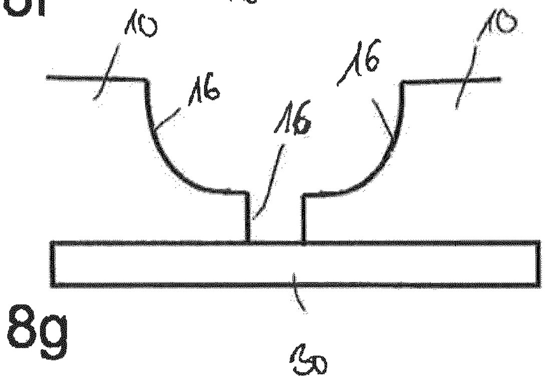

FIG. 8*g* shows the curved or bent course of the side face 15 which is to be formed in the side surface section 16 facing away from the ceramic element 30. In particular, comparatively large curvatures or large radii of curvature may be produced by means of etching, while use of mechanical tools and/or laser light will produce the narrow and preferably rectilinear isolation trench having side surface sections 16 which substantially extend perpendicularly to the main extension plane HSE on the side of the at least one metal layer 10 facing the ceramic element 30.

Figure 8H:
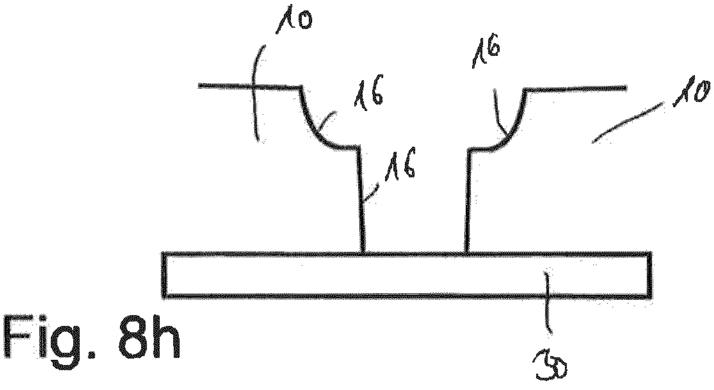

In particular, in the example embodiment of FIG. 8*h*, it may be seen that 10 a height of the substantially vertically extending side surface section 16 is greater than the extension of the curved side surface section 16 in the region of the at least one metal layer 10 facing away from the ceramic element 30.

Figure 9A:
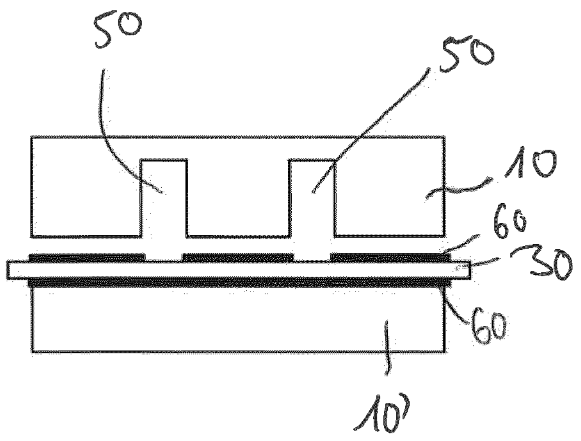
FIGS. 9*a* and 9*b* depict a method for producing a metal-ceramic substrate according to an eighth preferred embodiment of the present invention.
Figure 9B:
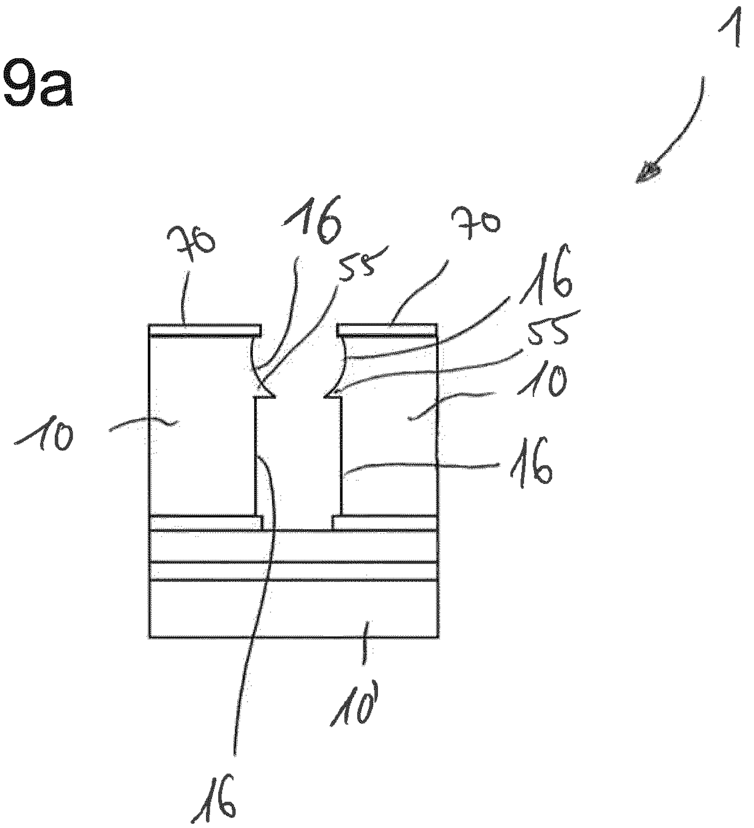

FIGS. 9*a* and 9*b* illustrate a method for producing a metal-ceramic substrate 1 according to an eighth preferred embodiment of the present invention. In this case, a recess 50 is first to be inserted into the at least one metal layer 10 on the side facing the ceramic element 30 in the fabricated state by means of a mechanical tool 40. In this case, a milling and/or drilling depth is greater than half, preferably greater than ⅔ and particularly preferably greater than ¾ the thickness D1 of the at least one metal layer 10. After joining, for example via a solder material 60, the at least one metal layer 10 will be machined by means of an etching process, in particular in a region which was not removed following machining using the mechanical tool 40, i.e., was left to remain. In this regard, it is preferred that the etching process is controlled such that a tapering projection 55 is left to remain on the side face 15. In particular, two tapering projections 55 arranged at the same height are left to remain following etching. In particular, the etched section of the side surface 15, i.e., the side surface section 16 associated with the etching, has a curved shape resulting in particular from the isotropic effect of the etching agent. In particular, the projection 55 is to have a flat, in particular substantially horizontal, course on the side facing the ceramic element 30, while the side facing away from the ceramic element 30 has a curved course. Preferably, a patterned resist layer 70 for etching will be arranged on the at least one metal layer 10, used to advantageously determine etching localization and/or size. In particular, the projection 55 is arranged in the upper section facing away from the ceramic element 30, i.e., the upper half, preferably the upper third and particularly preferably the upper quarter of the at least one metal layer 10.

Figure 10A:
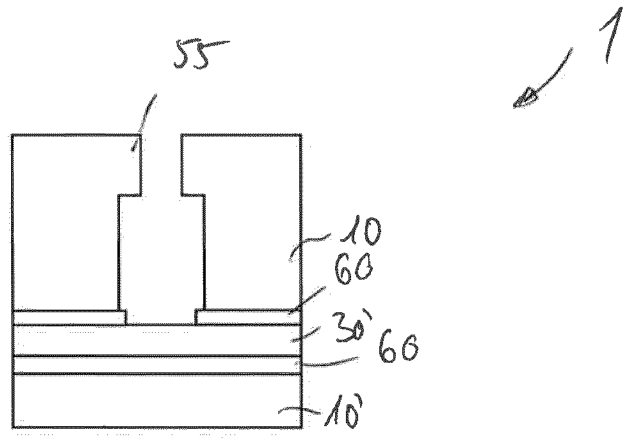
FIGS. 10*a* to 10*c* depict various side faces for a method produced by a method according to an example embodiment of the present invention.
Figure 10B:
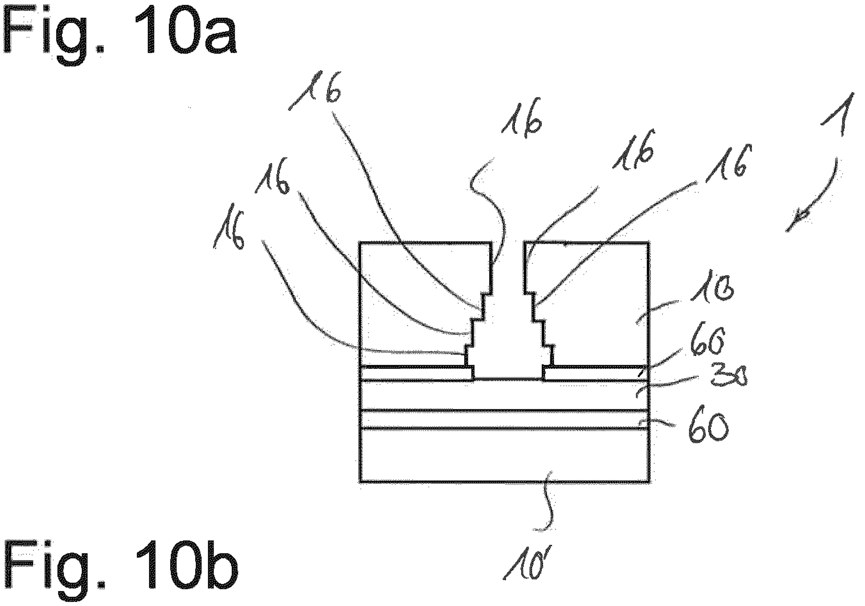
Figure 10C:
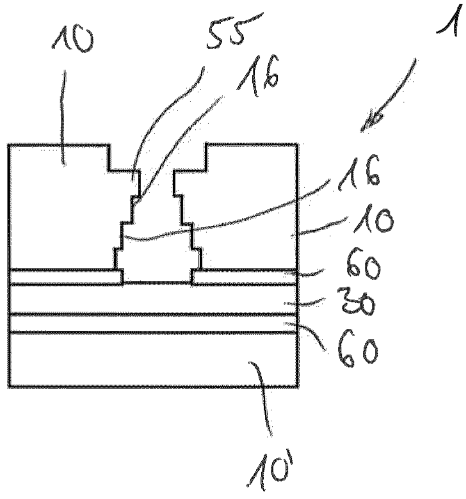

FIGS. 10*a* to 10*c* show various side faces 15 which may be realized by the method for producing the metal-ceramic substrates 1 according to an example embodiment of the present invention. For example, it is conceivable that recesses 15 of different widths are inserted into the at least one metal layer 10 by means of two cutting processes, for example on two opposite sides. In FIG. 10*a*, an opening is provided for this purpose on the side of the at least one metal layer 10 facing away from the ceramic element 30. In this way, it is possible to provide as large a region as possible on the upper side or on the outer side of the at least one metal layer 10 in which electrical component attachment is possible. In other words, in the example embodiment of FIG. 10*a*, a projection 55 projecting from the at least one metal layer 10 at least partially extends above the insulation trench. In this case, the projection 55 is flush with the outer side of the at least one 25 metal layer 10. For this purpose, it is conceivable to use two saw blades of different thicknesses, creating the recesses 50 of correspondingly different widths in the at least one metal layer 10 on opposite sides. This makes it possible to realize side faces 15 with side surface sections 16 that are laterally offset from one another and preferably run parallel to each other, so that a stepwise course of the side face 15 may be realized. In this example embodiment, a stepped course is to be inserted into the at least one metal layer 10 by means of various machining operations successively carried out on one side of the at least one metal layer 10, in particular in the half facing the ceramic element 30. Preferably, the side surface sections 16 are provided to substantially extend vertically, or perpendicular to the main extension plane HSE. Preferably, the side face comprises at least three, preferably at least four and more preferably five steps. In particular, it is provided that first the side of the at least one metal layer 10 facing the ceramic element 30 will be machined, preferably using several machining operations, for example to realize a stepwise course. Alternatively, one or more stepped shaping cutters are used to realize the stepwise course. Subsequently, the at least one metal layer 10 is attached to the ceramic element 30. Following attaching, separation of the at least one metal layer 10 on the side opposite to the ceramic element 30 will be performed to form different metal sections in the at least one metal layer 10.

The example embodiment of FIG. 10*c* differs from the example embodiment of FIG. 10*b* in that another machining step is performed on the outer side of the at least one metal layer 10 facing away from the ceramic element 30 to realize a course enlarging the isolation trench on the side of the at least one metal layer 10 facing away from the outer side of the at least one metal layer 10.

LIST OF REFERENCE NUMBERS

1 Metal-ceramic substrate
10 Metal layer
10' further metal layer
14 Rib
15 Side face
16 Side face section
17 Intermediate section
18 Undercut
20 backside metallization
30 Ceramic element
40 Mechanical tool
50 Recess
55 Projection
60 Solder material
70 Resist layer
D1 Thickness
HSE Main extension plane
S Stacking direction

The invention claimed is:

1. A method for producing a metal-ceramic substrate (1) comprising:

providing a ceramic element (30) and at least one metal layer (10), wherein the ceramic element (30) and the at least one metal layer (10) extend along a main extension plane (HSE), joining the ceramic element (30) to the at least one metal layer (10) to form a metal-ceramic substrate (1), characterized in that, for separating individual portions in the at least one metal layer (10), the at least one metal layer (10) is machined by means of a laser light in order to define a geometry, at least in some portions, of a side face (15) of the at least one metal layer (10) not running parallel to the main extension plane (HSE), wherein the laser light comprises ultra short pulses having a pulse duration shorter than 1 ns.

2. The method according to claim 1, wherein the at least one metal layer (10) has a thickness (D1) perpendicular to the main extension plane (HSE), which is greater than 1 mm.

3. The method according to claim 1, wherein the machining is performed such that a rib (14) is realized connecting at least two portions of the at least one metal layer (10).

4. The method according to claim 3, further comprising removing the rib (14), at least in some portions.

5. The method according to claim 1, wherein the mechanical tool comprises a milling tool and/or a saw blade and/or a punching or embossing part, the shape of which determines the geometry of the side face (15).

6. The method according to claim 1, the geometry of the side face (15) is determined by guiding tool.

7. The method according to claim 1, wherein the fabricated side face (15) is oblique and/or stepped and/or segmented.

8. The method according claim 1, wherein the fabricated side face (15) is bent and/or curved.

9. The method according to claim 1, wherein the at least one metal layer (10) is divided into a plurality of insulated metal portions, and the method further comprises subsequently determ ining the geometry of the side face (15) of the insulated metal portions.

10. The method according to claim 1, wherein joining the ceramic element (30) to the at least one metal layer (10) to form the metal-ceramic substrate (1) comprises a direct metal bonding method, a hot isostatic pressing method and/or a soldering method.

11. The method according to claim 2, wherein the at least one metal layer (10) has a thickness (D1) perpendicular to the main extension plane (HSE), which is greater than 1.3 mm.

12. The method according to claim 2, wherein the at least one metal layer (10) has a thickness (D1) perpendicular to the main extension plane (HSE), which is between 1.5 mm and 3 mm.

13. The method according to claim 3, further comprising removing the rib (14), at least in some portions, following joining.

14. The method according to claim 7, wherein removing the rib (14), at least in some portions, following joining, comprises laser light and/or etching and/or milling and/or spark erosion and/or electro-chemical processes.

15. The method according to claim 4, wherein removing the rib (14), at least in some portions, comprises laser light and/or etching and/or milling and/or spark erosion and/or electro-chemical processes.

* * * * *